(12) United States Patent
Bomphray (10) Patent No.: US 10,987,833 B2
(45) Date of Patent: Apr. 27, 2021

(54) MANUFACTURING FIBER-REINFORCED COMPOSITE STRUCTURES

(71) Applicant: WILLIAMS ADVANCED ENGINEERING LIMITED, Wantage (GB)

(72) Inventor: Iain Bomphray, Wantage (GB)

(73) Assignee: WILLIAMS ADVANCED ENGINEERING LIMITED, Oxfordshire (GB)

( * ) Notice: Subject to any disclaimer, the term of this patent is extended or adjusted under 35 U.S.C. 154(b) by 0 days.

(21) Appl. No.: 16/315,532

(22) PCT Filed: Jul. 5, 2017

(86) PCT No.: PCT/GB2017/051985
§ 371 (c)(1),
(2) Date: Jan. 4, 2019

(87) PCT Pub. No.: WO2018/007814
PCT Pub. Date: Jan. 11, 2018

(65) Prior Publication Data
US 2019/0240875 A1    Aug. 8, 2019

(30) Foreign Application Priority Data
Jul. 6, 2016    (GB) .................................... 1611788

(51) Int. Cl.
*B29C 35/02*    (2006.01)
*B29C 70/22*    (2006.01)

(52) U.S. Cl.
CPC ........ *B29C 35/0266* (2013.01); *B29C 70/222* (2013.01)

(58) Field of Classification Search
CPC ... B29C 35/0266; B29C 53/04; B29C 70/222; B29C 70/543; B29L 2031/3055
See application file for complete search history.

(56) References Cited

U.S. PATENT DOCUMENTS

| 5,173,220 A | 12/1992 | Reiff et al. |
| 6,375,120 B1 * | 4/2002 | Wolnek ..................... B32B 5/28 244/119 |

(Continued)

FOREIGN PATENT DOCUMENTS

| CN | 1336851 A | 2/2002 |
| CN | 101778713 A | 7/2010 |

(Continued)

OTHER PUBLICATIONS

GB Search Report, corresponding GB1611788.9, dated Jan. 10, 2017.

(Continued)

*Primary Examiner* — John L Goff, II
(74) *Attorney, Agent, or Firm* — Lando & Anastasi, LLP (57) ABSTRACT

The invention relates to a method of manufacturing a three dimensional structure having an internal space, the method comprising the following steps: (a) arranging a preform of fibre reinforced material in a first configuration in which the preform is supported by a support structure; (b) selectively curing the preform when laid out on the support structure to produce an intermediate preform, the intermediate preform comprising at least two selectively cured portions interconnected by at least one non-selectively cured portion; and (c) moving the two selectively cured portions with respect to one another to form the three dimensional composite structure in which the two portions at least partially surround the internal space of the structure. A preform of fibre reinforced material for use in a method of manufacturing a three dimensional structure having an internal space also forms part of the invention. The invention also relates to a device and intermediate preforms for the manufacture of a fibre-reinforced composite structure.

8 Claims, 8 Drawing Sheets

(56) References Cited

U.S. PATENT DOCUMENTS

| | | | |
|---|---|---|---|
| 2001/0013173 A1* | 8/2001 | Mertens | B64C 3/00 |
| | | | 29/897.2 |
| 2004/0079838 A1 | 4/2004 | Simpson et al. | |
| 2005/0149176 A1 | 7/2005 | Heggestuen et al. | |
| 2007/0182064 A1* | 8/2007 | Akishev | B29C 35/0266 |
| | | | 264/319 |
| 2009/0022940 A1 | 1/2009 | Weber et al. | |
| 2010/0124659 A1* | 5/2010 | Nelson | B29C 35/0266 |
| | | | 428/411.1 |
| 2011/0198020 A1 | 8/2011 | Marengo et al. | |
| 2014/0134377 A1* | 5/2014 | Goehlich | B29C 53/04 |
| | | | 428/57 |

FOREIGN PATENT DOCUMENTS

| | | |
|---|---|---|
| EP | 2730397 A1 | 5/2014 |
| GB | 2265854 A | 10/1993 |
| WO | 2005056278 A1 | 6/2005 |
| WO | 2015132387 A1 | 9/2015 |
| WO | 2016133393 A1 | 8/2016 |
| WO | 2018007814 A1 | 1/2018 |

OTHER PUBLICATIONS

International Search Report, corresponding to PCT/GB2017/051985, dated Oct. 11, 2017.

* cited by examiner

MANUFACTURING FIBER-REINFORCED COMPOSITE STRUCTURES

CROSS-REFERENCE TO RELATED APPLICATIONS

This application is a U.S. National Phase Application and claims the benefit under 35 U.S.C. § 371 of International Application No. PCT/GB2017/051985, filed Jul. 5, 2017, titled "MANUFACTURING FIBRE-REINFORCED COMPOSITE STRUCTURES," which claims priority to British Application No. 1611788.9, filed on Jul. 6, 2016, the entire contents of which are incorporated herein by reference in their entireties for all purposes.

The present invention relates to a method of manufacturing a three dimensional complex product. It in particular relates to a method of manufacture of a fibre-reinforced composite structure, a method of manufacturing a vehicle comprising the fibre-reinforced composite structure, a device for the manufacture of a fibre-reinforced composite structure and an intermediate preform for use in manufacturing a fibre-reinforced composite structure.

Complex three dimensional structures can be made in many different ways, with larger structures, such as vehicles, it is standard practice to produce the vehicle body by bonding, welding or otherwise fixing together preformed panels. The body may then be mounted to a separate chassis, or in the case of a monocoque body will perform the function of the chassis. Once the body is formed, the internal parts of the vehicle such as the wiring and seats are fitted into the body. This can be a difficult process which requires access through apertures in the body as well as working at heights for some steps of the process.

A similar method is applied in the manufacture of many other large complex structures, such as buses and trains, or even prefabricated buildings.

The body panels are typically made from steel or aluminium which are well suited to being formed into panels from flat sheets. In an alternative, it is also known to produce a body using fibre reinforced material. In this case, either panels are formed which are then bonded or glued together to form the three dimensional shape of the body or the body is laid up from uncured material to form the three dimensional shape and then cured.

For smaller complex structures it is known to lay up one or more preforms into (or over) a mould. The preforms may be either formed from dry fibre sheet material or may be a "prepreg" that already contains an amount of a matrix substance such as a resin. Individual sheets of fibre may be layered or woven together within the mould to build up the required shape. In the case of a dry fibre preform, a matrix substance may be applied once the fibre is laid up in the mould. Once the required shape of the structure has been formed by the mould, the structure is then cured to harden the matrix and fibres together. If a large complicated structure is to be manufactured, separate components can be individually moulded and cured before being glued or bonded together.

The composite structure may be any fibre-reinforced composite material made of a polymer matrix reinforced with fibres (e.g. carbon-fibre or glass-fibre or the like).

In a first aspect, the present invention provides a method of manufacturing a three dimensional structure having an internal space, the method comprising the following steps:

(a) arranging a preform of fibre reinforced material in a first configuration in which the preform is supported by a support structure;

(b) selectively curing the preform when laid out on the support structure to produce an intermediate preform, the intermediate preform comprising at least two selectively cured portions interconnected by at least one non-selectively cured portion; and (c) moving the two selectively cured portions with respect to one another to form the three dimensional composite structure in which the two portions at least partially surround the internal space of the structure.

The present invention provides a method of manufacturing a three dimensional composite structure in which a preform is selectively cured whilst in a first configuration where it is generally two dimensional and laid out on a support structure to form an intermediate preform with selectively cured rigid sections connected by non-selectively cured flexible sections. The shape of the intermediate preform can then be manipulated by raising one of the selectively cured portions from the support to move it into the second configuration which corresponds to the final required three dimensional shape of the composite structure.

There may be more than one selectively cured portion, each joined to at least one adjacent selectively cured portion by a non-selectively cured portion. This allows complex three dimensional shapes to be formed from a generally flat and single preform.

The method of the invention may be used to produce a wide range of structures but is especially useful as a method of producing a vehicle body. For example, one of the selectively cured portions may comprise a floor of the body, another may form a side of the body, another may form the front or rear and another may form the roof of the vehicle. Initially they may be laid out flat on the support and once selectively cured are folded up to form the three dimensional body. The non-selectively cured portions may join the floor to at least one of the sides, and at least one of the sides to the roof, removing the need for separate bonding in those areas.

The method may comprise a step of adding components onto the preform when it is generally flat, i.e. before step (a), before step (b) or after step (b) but before step (c). This may comprise adding components that will be located inside the structure once complete. In the case of a vehicle this may comprise adding the wiring loom, or the seats or door cards or roof lining, but can be any type of component or material. This allows a number of components and/or similar or dissimilar materials to be more easily incorporated into the completed structure.

This requires the preform to be laid out flat with the upper surface being the surface that will be inside the three dimensional structure once finished, and the underside being the outer face of the finished structure.

Adding these components when the body remains flat is advantageous as it is easier to complete that work compared with working inside the body when in the three dimensional final form.

Once the components have been added the panels may be folded up to form the three dimensional body.

The selective curing process may advantageously allow the movement of the selectively cured portions of the intermediate preform by linking them with the still malleable non-selectively cured portions. The selective curing therefore allows the same material to be in two different states simultaneously by providing at least two discrete curing stages.

This method has a number of advantages over the prior art. A large complex structure can be produced by shaping or re-configuring the selectively cured preform into the required final shape, rather than bonding together several separately cured components. The preform may therefore form a net that may be manipulated (e.g. folded) to form the composite structure. This will reduce the number of joints that must be bonded in the final structure, and thus improve the strength of the structure.

Other advantages include the reduction of waste material by using a single net to create the composite structure. Furthermore, the manufacture time and process complexity may be reduced because there is no requirement to produce a large number of separately cured components that must be bonded together. The cycle time is therefore reduced by removing the separate panel bonding operations. Furthermore, while in the first configuration, the eventual inside of a complex structure (such as a vehicle chassis or body) may be more easily accessed in comparison to when it is in the second configuration. Also, a further advantage arises when additional components are added or installed into the composite structure more easily at the intermediate preform stage. Prior art methods do not provide a distinct first and second configuration—all components must be installed when the composite structure is in the second configuration when access may be limited or more difficult.

The method may comprise a further curing step performed once the intermediate preform has been moved into the second configuration. The further curing step may comprise fully curing, or at least partly curing, the non-selectively cured portions. This may allow the intermediate preform to be fully hardened in the second configuration to form the final composite structure. This may improve the strength of the final structure. In some embodiments, this further curing step may not be present. In such an embodiment, the non-selectively cured portions may be left uncured, or only partially cured. In other embodiments they may be left to cure naturally in ambient conditions.

At least one of the non-selectively cured portions may define a flexible hinge that allows the selectively cured portions to be moved.

The method may comprise a further step, performed after the selectively cured panels are moved, of curing the non-selectively cured portions. This prevents further movement and helps maintain the final three dimensional shape and may improve the final strength of the structure.

The step of selectively curing the preform may comprise curing the selectively cured portions to a greater extent compared to the non-selectively cured portions. This allows the non-selectively cured portions to remain flexible or malleable so that the intermediate preform can be moved from the first configuration to the second configuration. In other embodiments, both of the selectively cured portions and non-selectively cured portions are partly cured, but to different amounts. The method thus makes use of the malleability of uncured composite laminates to allow the shape to be changed.

The curing may be an active process in which one or more of heat, microwave energy, ultraviolet radiation, and pressure are applied to the portions which are selectively cured but not applied- or not applied in as high a quantity- to the portions which are not selectively cured. Alternatively the preform may be arranged so that it naturally cures at a quicker rate in the portions that are to be selectively cured and a slower rate in the other portions, through appropriate choice of materials. In each case there will be a point in time when some portions are more cured than others and hence sufficiently rigid to move whilst others are not so cured and flexible enough to bend or fold.

The step of selectively curing the preform may comprise fully curing the selectively cured portions while leaving the non-selectively cured portions uncured, or at least only partly cured. The step of selectively curing the preform may comprise at least partially curing the selectively cured portions, while leaving the non-selectively cured portions uncured. This allows different degrees of curing to be applied to the non-selectively cured portions compared to the selectively cured portions.

The step of selectively curing the preform comprises selectively applying heat, or pressure or both to portions of the preform forming the selectively cured portions but not to other portions. By selectively applying heat and/or pressure, certain areas of the preform can be cured, whilst other parts of the preform can remain completely uncured, or at least only partly cured, to retain flexibility. This allows separate or distinct selectively cured portions and non-selectively cured portions to be formed. The heat and/or pressure may also help to consolidate the preform.

The preform may be substantially planar when in the first configuration; and the intermediate preform may be folded into a more three dimensional shape when in the second configuration. Whilst in the first configuration the flat or planar shape of the intermediate perform allows easy access. For example, parts of the intermediate preform that will eventually form the interior of the final composite structure can be reached more easily when in an open or planar first configuration. This may allow additional components to be fitted more easily, or may allow coatings or the like to be applied more easily to the composite structure. This is advantageous over prior art methods where no separate first and second configurations are provided—the composite structure is simply moulded in the final desired shape.

The preform may comprise a net from which the whole (or part) of the composite structure may be formed. Optionally, the net forms a two-dimensional pattern corresponding to a three-dimensional shape of the composite structure being manufactured. This means that the whole of the three dimensional composite structure may be formed by folding up a single two-dimensional net.

The preform may comprise portions of material with different properties arranged at spaced locations across the net. For instance, a portion of higher strength material may be applied to a region where high strength is needed in the finished product, and a portion of lower strength material may be applied in other areas where less strength is required.

The preform may comprise a single continuous sheet of fibre material (i.e. does not include multiple sheets of fibre joined together, or separately cured components glued together). This may improve the strength of the final composite structure being produced. This is advantageous over prior art methods where multiple sections of fibre material may be combined in order to fill a large complex mould or where separate components are cured and bonded or welded together.

The method may comprise fitting or installing a reinforcement member to the selectively cured portions of the intermediate preform before it is moved to the second configuration. This may provide additional strength to the final composite structure. The reinforcement member may be fitted while the intermediate preform is in the first configuration and access is easier. Examples of reinforcing members that could be applied are metal elements that form the B-posts of a vehicle of A-posts. The step of selectively curing may bond these elements to the preform.

It is preferred that in step (a) a preform is provided which includes sheets of fibre material that extend continuously across the preform over both the selectively cured and selectively uncured portions. This lends great strength to the finished structure as the fibres pass across the hinges into the adjacent portions, allowing tensile forces to be carried across the hinge so that the hinge is not a potential point of weakness as is the case in many prior art structures where separate panels are fixed together.

In an alternative in accordance with another aspect of the invention, the method may comprise providing a preform in a first configuration which is rigid, and rather than curing the preform in step (b) to provide cured portions and selectively uncured portions, the method step (b) may comprise applying heat to the preform to at least partially melt at least one region to form a flexible hinge connecting two unmelted portions, thereafter in step (c) moving the two unmelted portions with respect to one another to form the three dimensional composite structure in which the two portions at least partially surround the internal space of the structure.

After moving the two unmelted portions the hinge may be left to solidify. To facilitate the melting of the hinge portion, the preform may be provided with at least one heating element which covers the hinge portion such that step (b) can be achieved by passing an electrical current through the heating element.

The hinge element may be fixed to the surface of the preform or may be embedded within the preform. It may comprise a resistive heating wire.

In a practical arrangement, the preform may define multiple hinge portions, each of which may be provided with a heating element. The heating elements may be connected together in series or in parallel to form an electrical circuit.

The rigid perform may be generally flat. Being rigid it may not require a support when in the first configuration as it may be able to retain its own shape. However, it is preferred that it is flat or substantially flat and laid out on a support surface in the first configuration.

The alternative method using a rigid preform, rather than a flexible preform that is to be cured, may be beneficial in some circumstances. For example, the rigid flat preform, whilst bulky, may be easier to transport compared with an uncured preform. There is no risk of uncured material starting to cure over time, as the preform is rigid and is not going to cure. The disadvantage is that it is bulky compared with the provision of a flexible preform, and there is more energy needed to construct the final structure. Initially energy is needed to produce the rigid preform, and then more to melt the hinge portions.

In a second aspect, the present invention provides a method of manufacturing a vehicle, the vehicle comprising a body having a floor, one or more side panels and a roof panel, the method comprising forming the body by applying the steps of the first aspect in which the selectively cured portions in step (b) comprise the floor, sides and roof.

The method of manufacturing the vehicle may further comprise installing at least one component of the vehicle into the intermediate preform before it is moved to the second configuration. i.e. when the body, sides and roof are laid out flat.

In a third aspect, the present invention provides a device for the manufacture of a fibre-reinforced composite structure, the device comprising: a support structure on which a preform may be laid up from one or multiple sheets of material, selective curing means arranged to selectively cure at least part of a preform to produce an intermediate preform, the intermediate preform comprising a plurality of selectively cured portions interconnected by at least one non-selectively cured portion.

The device may selectively apply heat and/or pressure to a preform in order to produce an intermediate reform.

The selective curing means may comprise a press mechanism comprising a pair of movable opposing surfaces arranged to engage the preform to selectively apply heat and/or pressure to at least part of the preform. This provides a quick and efficient method of selectively applying heat and pressure to the preform. One of the movable surfaces may define the support structure for holding the laid up preform prior to curing.

One or both of the opposing surfaces forms a mould arranged to shape the preform. This allows the shape of the selectively cured portions to be defined.

The selective curing means may comprise one or more heated platens adapted to be discretely applied to the surface of the preform to contact areas that are to be selectively cured.

The selective curing means may comprise a selective energy delivery means arranged to selectively direct energy in the form of radiation (e.g. thermal, ultraviolet, or microwave radiation), convection, induction or conduction to certain parts of the preform.

In a fourth aspect, the present invention provides an intermediate preform for use in manufacturing a fibre-reinforced composite structure, the intermediate preform comprising a plurality of selectively cured portions interconnected by at least one non-selectively cured portion, the selectively cured portions being movable from a first configuration to a second configuration to produce the composite structure.

The intermediate preform may be produced by the first two steps of the method of the first aspect described above. In other embodiments, the intermediate preform may be produced using any other suitable method. The intermediate preform may be folded to the second configuration to produce the desired composite structure. The final step of moving the composite structure into the second configuration may be done as part of a separate manufacturing process. In some embodiments, the intermediate preform may be stored or transported to a different location before being moved into the second configuration. The intermediate preform may take up less space than the final composite structure and so it may be easier to store and transport.

In a further aspect the invention provides a preform of fibre reinforced material for use in a method of manufacturing a three dimensional structure having an internal space, the preform comprising:

A first portion comprising at least one sheet of fibre material and a matrix material;

A second portion comprising at least one sheet of fibre material and a matrix material; and A third portion which connects the first portion to the second portion, the third portion comprising at least one sheet of fibre material and amatrix material which has different cure properties or different melt properties to that used in the first and second portions.

The first and second portions may, in use according to method of an aspect of the invention, form the selectively cured portions of an intermediate preform and the third portion may form the non-selectively cured portion. In an alternative they define two rigid portions connected by a molten or partially molten hinge portion.

Each portion of the preform may comprise a plurality of layers of fibre material.

The matrix material may comprise an uncured or partially cured thermoset material.

The matrix material may comprise a rigid thermoplastic material.

The matrix material may comprise an epoxy, vinylester or polyester thermosetting plastic.

The matrix material of the third portion may have a higher cure temperature compared with the first and second portions, or may have a slower rate of cure when subject to the same temperatures as the first and second portions, or may have both a higher cure temperature and a lower cure rate compared with the resin matrix material of the first and second portions.

The matrix material of the third portion may have a lower melt temperature compared with the first and second portions.

The sheets of fibre material may comprise sheets of woven elongate fibres. The elongate fibres may be, for example, carbon, glass, aramid or any other suitable reinforcing fibre known in the art.

The sheets of each of the portions may be dry fibre sheets which are overlaid with at least one sheet of uncured resin. By dry fibre the skilled person will understand that we mean sheets that are not impregnated with any resin matrix material.

Alternatively the sheets of each of the portions may be pre-impregrnated with resin matrix material.

A combination of dry and pre-preg sheets may be provided.

The preform may comprise at least one sheet of dry-fibre material which extends continuously across the first portion and extends across the third portion to further extend continuously across the second portion. There may be more than one such sheets, stacked up in layers.

The use of a sheet that extends across the third portion provides great strength as fibres extend right across what in use forms the hinge portions and are anchored by the portions on either side.

The third portion may comprise a plurality of fibre sheets which are arranged in layers, where the edges of some of sheets at the interface with the first portion and at the interface with the second portion are offset from the edges of other sheets through the layers so that the sheets are interleaved with corresponding edge regions of sheets of the first and second portions.

This interleaving of sheets of the third portion with sheets of the first and second portions is especially suitable for the cases where the sheets are pre-impregrnated with matrix material as following the initial cure to the form the intermediate preform the first and second portions will grip onto the edges of the uncured- or partially cured-third portion.

Where the sheets are dry sheets, the layers of resin matrix used in the third portion may have different properties to the layers used in the first and second portions.

The preform may comprise a two-dimensional net that can be folded or shaped to form the three dimensional shape of an article to be manufactured.

The preform may include one or more tabs which may be folded to overlap other portions of the preform when moved to form a three dimensional article.

The preform may include a plurality of first portions, or second portions and of third portions, to define a plurality of hinges allowing a complex three dimensional shape to be produced.

In a sixth aspect, the present invention provides a method of manufacturing a three dimensional structure having an internal space, the method comprising the following steps: (a) arranging a preform of fibre reinforced material in a first configuration in which the preform is supported by a support structure, the preform comprising a first material that cures at a first rate and a second material that cures at a second rate which is slower than the first rate; (b) allowing the first material to cure to produce an intermediate preform; (c) moving the first material relative to the second material such that the two materials at least partially surround the internal space of the structure; (d) allowing the second material to cure.

Embodiments of the invention will now be described, by way of example only, with reference to the accompanying drawings, in which.

The present invention relates to a method of manufacturing a fibre-reinforced composite structure. In the following example a method of making a body of a vehicle is set out.

The fibre-reinforced composite structure may be any fibre-reinforced material made of a polymer matrix reinforced with a fibre material. The fibre material may be, for example, carbon, glass, aramid or any other suitable reinforcing fibre known in the art. The polymer matrix may be any suitable material which can be used to set the shape of the composite material, such as epoxy, vinylester or polyester thermosetting plastic. The fibre-reinforced composite structure may, for example, be a carbon-fibre or glass-fibre material suitable for use in the automotive, aerospace or construction industries. In the described embodiment, the method of the present invention may be used to produce a structural component for a vehicle such as a car chassis or body. The invention is not however limited to this example. In other embodiments, the fibre-reinforced composite structure may be for any other purpose as would be apparent to the skilled person.

Figure 1:
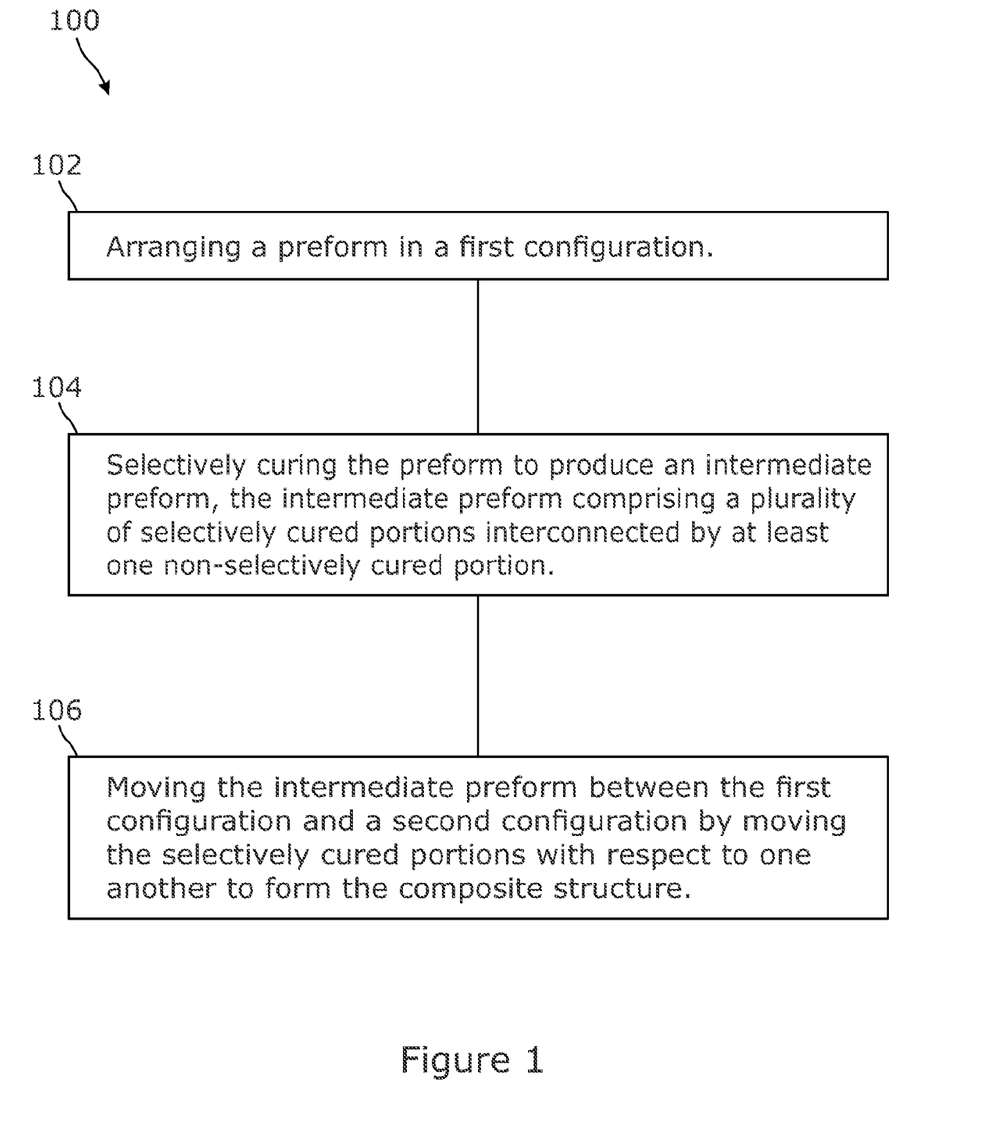
FIG. 1 shows a method of manufacturing a fibre-reinforced composite structure according to an embodiment of the invention.

A method 100 of manufacturing a fibre-reinforced composite structure according to an embodiment of the invention is shown in FIG. 1. The method 100 generally comprises the following steps: arranging 102 a preform in a first configuration; selectively curing 104 the preform to produce an intermediate preform; and moving 106 the intermediate preform between the first configuration and a second configuration to form the composite structure.

By "selectively-cured" we mean that a portion of the preform is cured at a faster rate than another "non-selectively cured" portion. In doing so, selectively-cured portions may have more rigidity than non-selectively cured portions, at least immediately following the step of selectively curing 104. The term "selectively cured" includes forcing a portion of the preform to cure at a faster rate by the selective application of heat and/or pressure. "Selectively cured" should be understood as also including not only "forcing" the preform to cure at different rates, but allowing it to cure naturally at different rates in ambient conditions. In such an embodiment, the preform comprises a first material that cures at a first rate and a second material that cures at a second rate which is slower than the first rate. The "selective curing" may then comprise allowing the preform to cure in ambient condition for a particular period of time such that the "selectively cured" portions are cured to a greater extent compared to the "non-selectively cured" portions.

Figure 2A:
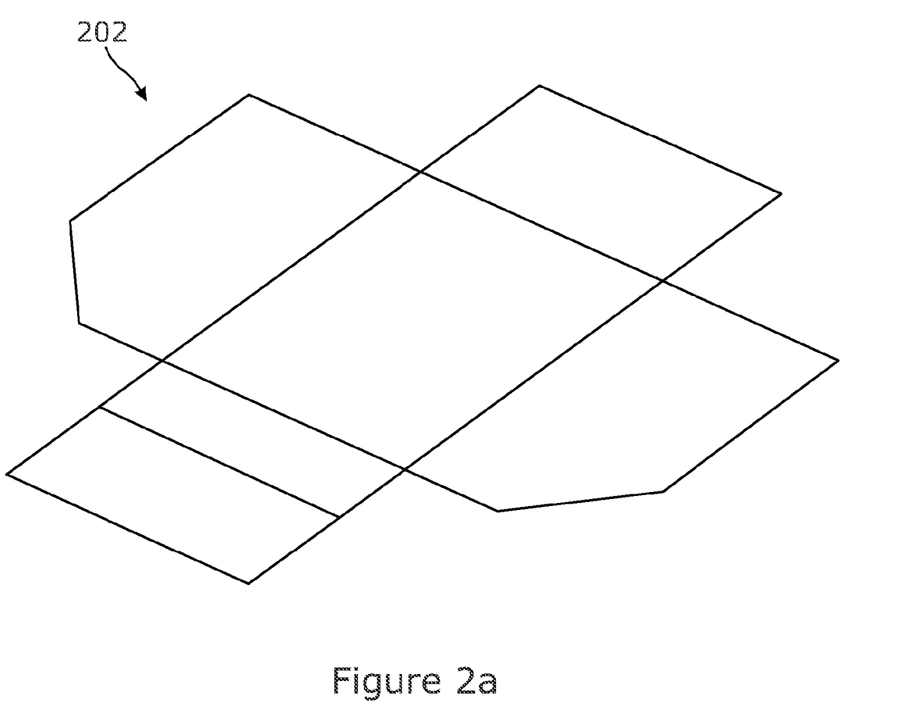
FIG. 2a shows a preform according to the method shown in FIG. 1.
Figure 2B:
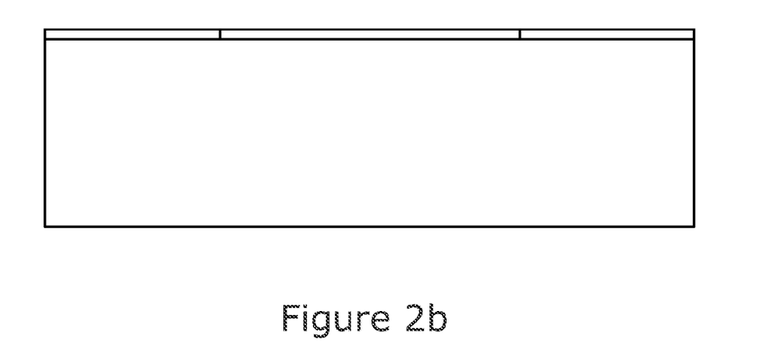
FIG. 2b shows the preform of FIG. 2a, in a side-on view such that the support structure is visible.

The first step 102 of arranging a preform 202 in a first configuration is shown schematically in FIG. 2a. The preform 202 is shaped so as to form a net that can be folded or otherwise manipulated to provide the desired shape (or at least part of the desired shape) of the final composite structure being manufactured. The net may therefore correspond to a two-dimensional pattern from which a final three-dimensional composite structure is formed. In some embodiments the net may therefore provide all of the parts of the desired composite structure (e.g. the net corresponds to the whole of the final composite structure), with no additional panels or sections to be added later. As can be seen in FIG. 2a, the first configuration corresponds to an open (or unfolded) configuration of the net i.e. before it has been folded into the desired shape of the composite structure (corresponding to the second configuration as will be described later). In some embodiments, the net provided by the preform may not correspond to the whole of the desired composite component. In such embodiments, additional components may be added to produce the final desired composite structure. A support means or a mould may be provided to support the preform in the first configuration before and during the selective curing step 104.

Arranging the preform 202 in a first configuration may comprise cutting the preform and/or shaping the preform by placing it in or over a mould or mandrel as is known in the art (e.g. "laying up" the preform). The preform 202 may be any suitable dry-fibre material to which a matrix material (e.g. a resin) is added later (e.g. once in the mould) to harden the structure when cured. In other embodiments, the preform 202 may already contain an amount of matrix resin (i.e. it may be "prepreg" preform). In some embodiments, the preform 202 may comprise a single continuous sheet of fibre material (as described later). In other embodiments, the preform 202 may comprise one or more sections or layers that may be stacked, stitched, woven or otherwise combined together when laid up into the mould. The invention may relate to both thermoset and thermoplastic materials. Furthermore, the composite structure may be a reinforced or an unreinforced composite structure as described later.

In the described embodiment, the final composite structure is a component forming the body or chassis of a vehicle (e.g. a car or aircraft). In this embodiment, the first configuration corresponds to a configuration in which the side panels, bulkheads, floor etc. of the body are unfolded into a generally flat or expanded configuration as can be seen schematically in FIG. 2a. In other embodiments, the composite structure is not limited to the shape shown in the Figures and may be any other shaped composite structure.

Figure 3:
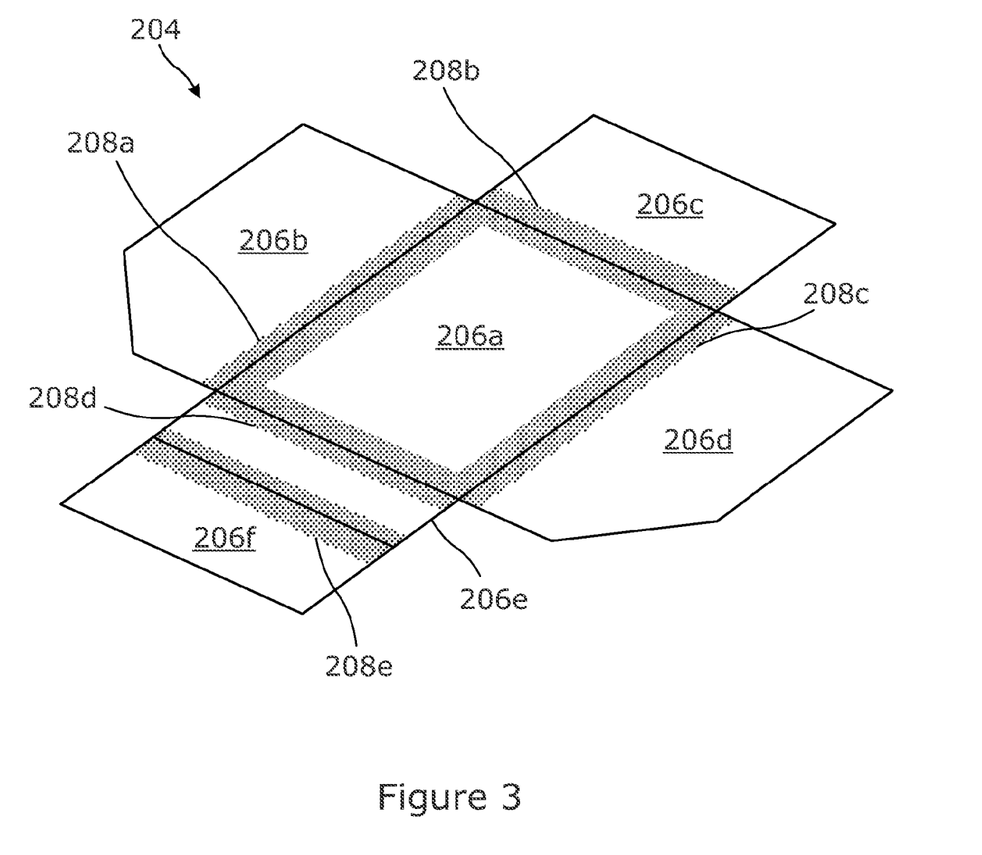
FIG. 3 shows an intermediate preform in a first configuration according to the method shown in FIG. 1.

Once the preform 202 has been arranged in the first configuration, the method 100 proceeds with the step of selectively curing 104 the preform 202 to produce an intermediate preform 204 as shown in FIG. 3. The selective curing step 104 comprises curing only specific parts of the preform 202 such that the resulting intermediate preform 204 comprises a plurality of selectively cured portions 206a, 206b, 206c, 206d, 206e, 206f interconnected by at least one non-selectively cured portion (five of which are shown in FIG. 3 labelled as 208a, 208b, 208c, 208d, 208e). During the selective curing process 104, the selectively cured portions 206a-206f may be cured to a greater extent or degree compared to the non-selectively cured portions 208a-208e. For example, the selective curing step 104 may comprise fully curing the selectively cured portions 206a-206f while leaving the non-selectively cured portions 208a-208e uncured, or at least only partly cured. In some embodiments, the selectively cured portions 206a-206f may be at least partially cured, while leaving the non-selectively cured portions 208a-208e uncured. In other embodiments, both the selectively cured portions and non-selectively cured portions may both be partially cured by the selective curing step. The selectively cured portions and non-selectively cured portions may extend through the thickness of respective parts of the preform to form rigid portions separated by flexible portions. In other embodiments they may be formed by different layers of the preform.

In some embodiments, heat and or pressure applied to the selectively cured portions may spread to the non-selectively cured portions, despite steps taken to isolate the curing to specific regions of the preform. This can lead to some inadvertent curing of the preform in the non-selectively cured portions. This effect can be managed to provide the required selective curing of the preform.

The selectively cured portions 206a-206f may correspond to areas of the preform that comprise the floor, side panels and bulkheads of the vehicle body or chassis being manufactured as shown schematically in FIG. 3. In other embodiments, greater or fewer components of the vehicle chassis or body may be provided by the selectively cured portions. In some embodiments the whole of the vehicle chassis is provided by the preform with no other panels added. The non-selectively cured portions 208a-208e may correspond to areas of the preform 202 that link these parts of the final composite structure—e.g. the non-selectively cured portions may comprise the corners and/or edges of the final composite structure. The non-selectively cured portions 208a-208e may therefore define interconnecting boundaries between the selectively cured portions 206a-206f as shown by the shaded regions of FIG. 3. By interconnecting the selectively cured portions 206a-206f by the non-selectively cured portions 208a-208e in this way a hinged net is formed that can be folded into the final composite structure as shown in FIG. 4.

In the described embodiment, the preform 202 may be cured by the application of heat and/or pressure as is known in the art. The level of heat and/or pressure applied may be tailored to the type of fibre or matrix material being used, or to the shape and thickness of the preform. The step of selectively curing 104 the preform 202 may therefore comprise selectively applying heat, pressure or both to only certain parts or areas of the preform 202. In other embodiments, a greater amount of pressure or heat may be applied to certain parts of the preform 202 in order to selectively cure it. This may be done by applying heat and/or pressure to certain parts of the mould (or mandrel) used to shape the preform 202. In other embodiments, heat and/or pressure may be applied directly to the preform 202. The preform 202 may, for example, be selectively cured in a heated press arranged to apply heat and pressure to only parts of the preform 202 (as will be described later). In other embodiments, one or more heated platens may be bought into contact with areas of the preform that are to be selectively cured. In other embodiments, alternative selective curing techniques may be used to selectively apply heat and/or pressure to the preform. For example, energy may be applied as radiation, convection, induction or conduction. In some embodiments, radiated heat, ultraviolet radiation, or microwave energy may be selectively applied to the areas to be selectively cured. In such an embodiment, the non-selectively cured portions may be masked so they do not receive (or receive less) radiative heat/ultraviolet/microwave energy. In some embodiments, a vacuum or inflatable bladder may be used rather than a press to provide pressure to the preform.

Once selectively cured, the selectively cured portions 206a-206f of the resulting intermediate preform 204 may have a greater rigidity in comparison to the non-selectively cured portions 208a-208e. The non-selectively cured portions 208a-208e may have a greater flexibility in comparison to the selectively cured portions 206a-206f. The non-selectively cured portions 208a-208e may therefore remain malleable after the selectively curing step 104, while the selectively cured portions 206a-206f may become relatively stiff and rigid. This allows the selectively cured portions 206a-206f to hold their shape as defined by the mould or mandrel, whereas the non-selectively cured portions 208a-208e may act as hinges allowing the shape of the intermediate preform 204 to be manipulated. This allows the final composite structure to be shaped in two separate stages (before and after the selective curing stage 104). This is in contrast to prior art methods in which a single shaping or moulding step is preformed followed by a single curing process to fully cure the composite structure.

Figure 4:
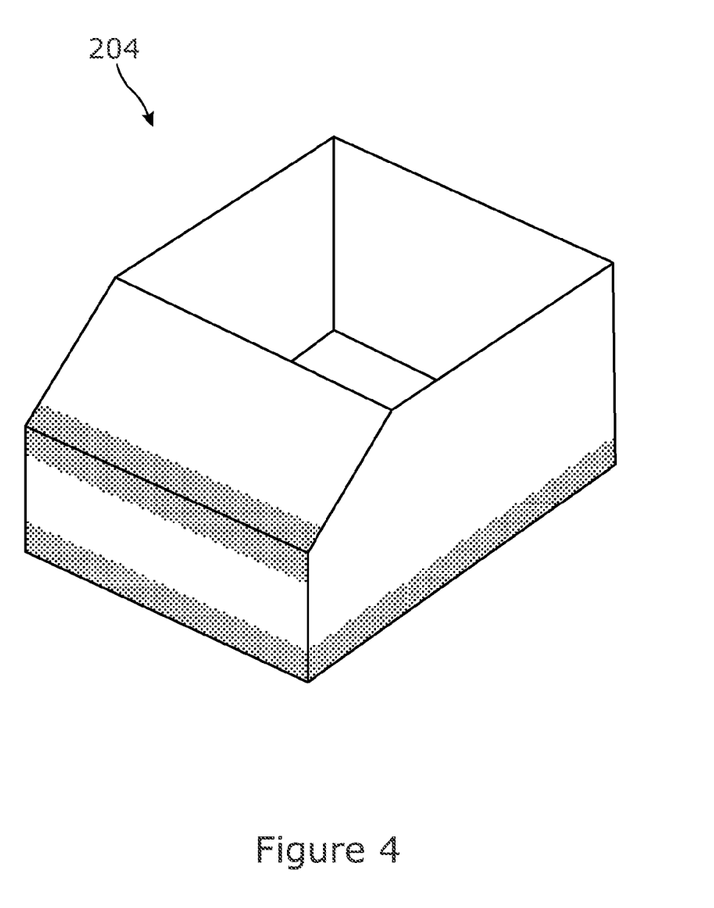
FIG. 4 shows the intermediate preform of FIG. 3 moved to a second configuration to form the composite structure.

Once the selective curing step 104 is complete, the method 100 comprises moving the intermediate preform 204 between the first configuration (shown in FIG. 3) and a second configuration (shown in FIG. 4). In some embodiments, the intermediate perform 204 may first be removed or released from the mould used to shape the selectively cured portions 206a-206f. The intermediate preform 204 is moved to the second configuration by moving the selectively cured portions 206a-206f with respect to one another. This changes the shape of the intermediate preform 204 into the desired shape of the final composite structure being manufactured as can be seen in FIG. 4.

The non-selectively cured portions 208a-208e are arranged to control the movement between the first configuration and the second configuration. By selectively curing the preform, the non-selectively cured portions 208a-208e may be left uncured (or only partly cured) to later enable the controlled movement between the first and second configurations.

In some embodiments, the movement from the first configuration to the second configuration may be controlled by deforming the non-selectively cured portions 208a-208e. This deforming may be such that the selectively cured portions 206a-206f are moved with respect to one another. The deformation may in some embodiments comprise folding one or more of the non-selectively cured portions 208a-208e. The still malleable or flexible non-selectively cured portions 208a-208e thus allow the selectively cured portions 206a-206f to be folded or hinged relative to one another and the movement is controlled by this hinging. The non-selectively cured portions 208a-208e thus form hinge means (or hinge portions) that hinge-ably couple the selectively cured portions to create a re-configurable structure. The hinge portions may extend along the boundaries or joints between the selectively cured portions 206a-206f. In the described embodiment, the non-selectively cured portions 208a-208e comprise hinge portions extending between the body side panels, floor, pillars and bulkheads of the vehicle chassis or body.

The shape and position of the non-selectively cured portions 208a-208e may determine the final shape of the composite structure being manufactured. For example, deformation (or folding) of the intermediate preform occurs preferentially along the non-selectively cured portions, which therefore act to guide the location of the folds created in the intermediate preform.

In some embodiments, the preform 202 (and resulting intermediate preform 204) may be substantially flat or planar when in the first configuration, with the intermediate preform 204 being folded to form the second configuration. This initial flat arrangement of the first configuration allows greater access to areas that will become the interior of the final composite structure. This may, for example, allow additional components or systems to be fitted or installed while the intermediate preform 204 is in the first configuration and access is easier than when it is in the second configuration. This can make the manufacture of a complex product (such as a vehicle or aircraft, for example), easier when compared to prior art methods in which further components must be fitted or installed when the composite structure is in its final shape. In other embodiments, the first configuration may be any other unfolded configuration of the net forming the composite structure, and may not necessarily be substantially planar or flat.

In some embodiments, the method 100 may end once the preform has been moved to the second configuration to produce the composite structure. In such an embodiment, the non-selectively cured portions 208a-208e are left uncured, or left at least only partially cured. Any remaining joins within the structure may be glued or bonded as required (e.g. those not linked by the non-selectively cured portions). In some embodiments, the intermediate preform may be left to fully cure naturally (e.g. at ambient conditions).

Figure 5:
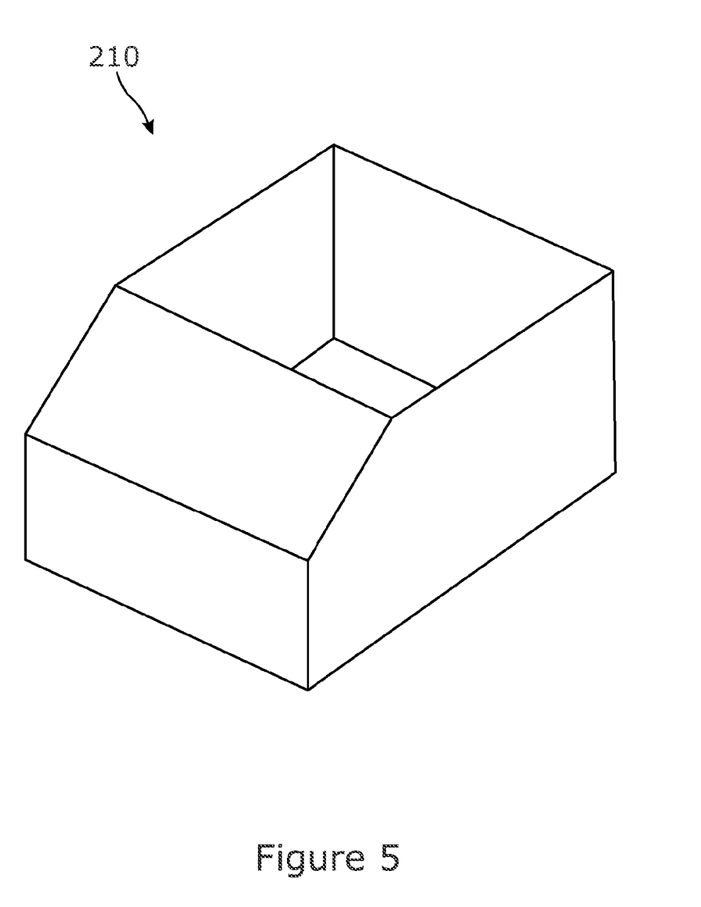
FIG. 5 shows the composite structure after an optional further curing step has been applied.

In other embodiments, once the intermediate preform 204 has been moved to the second configuration, the method 100 may proceed with one or more further curing steps. The further curing step may comprise fully curing the intermediate preform to form a final composite structure 210 as shown in FIG. 5. The further curing step may be carried out while the intermediate preform 204 is in the second configuration. A mould or jig may be provided to hold the shape of the intermediate preform 204 while the second curing step 108 is carried out so no further changes in shape can occur. In some embodiments, the further curing step may fully cure the intermediate preform 204 to form a hardened final composite structure. The further curing step may cure the non-selectively cured portions 208a-208e to a greater extent compared to the already selectively cured portions 206a-206f, and may be carried out using the same or a similar technique to the selective curing step 104. In some embodiments, further heat and/or pressure may be applied to the non-selectively cured portions 208a-208e such that they go from being uncured (or only partially cured) to being fully cured. In other embodiments, heat and/or pressure may be applied to the whole of the composite structure such that the selectively cured portions 206a-206f go from being partially cured to being fully cured (or are simply heated with no further curing taking place if already cured), while the non-selectively cured portions 208a-208e are also fully cured. Once the further curing step 108 has been completed, any remaining joints within the structure can be glued or bonded together as required if not done already.

In some embodiments, the method 100 may further comprise fitting or installing one or more reinforcement members to the selectively cured portions of the intermediate preform before it is moved to the second configuration. The reinforcement member(s) may comprise an additional structural component such as a metal stiffening member or the like. This may provide additional strength to the final composite structure. The reinforcement member(s) may be fitted while the intermediate preform is in the first configuration and access is easier. They may for example be fitted during the process of laying up the preform. The reinforcement member(s) may otherwise be fitted at any other stage of the method 100.

The method 100 provides a two stage manufacturing process in which the shape of the composite can be manipulated after the selective curing step 104 has been carried out. This allows the intermediate preform 204 to be moulded and selectively cured in a flat and open position. The intermediate preform 204 can thus form a net from which a larger complex shape can be created by folding the intermediate preform 204. Such a complex shaped structure would otherwise have to be manufactured from multiple individually moulded and cured components that are bonded together. The number of joints in a composite structure made using the method of the present invention may therefore be fewer compared to a structure made from individual components. This may improve the strength and rigidity of the composite structure. Furthermore, the manufacturing time may be reduced and the manufacturing process simplified as the need to produce large numbers of constituent components may be reduced. The manufacture of the composite structure can be timed with production and assembly requirements more efficiently. This may reduce the bill of materials and part count by replacing individually moulded and cured body sides, floor pillars and front and rear bulkheads with a single piece. In some embodiments, the preform may comprise a single continuous material (or a plurality of layers of a continuous fibre material). This may improve the strength of the final composite structure. This allows larger and more complex shapes to be moulded from a single preform.

In some embodiments, the steps of method 100 may be performed separately—e.g. they may be performed as part of two different manufacturing processes. In some embodiments, the intermediate preform produced using the method 100 may be provided as an output, with the movement to the second configuration performed separately. For example, the intermediate preform 204 may be provided by a composite structure manufacturer to a third party to be assembled into a vehicle or the like. The intermediate preform 204 may be transported while in the first configuration in which it is easier to transport (e.g. the planar first configuration may also facilitate easy transport and storage). The intermediate preform 204 may then be moved to the second configuration during assembly of the vehicle, and any additional bonding and further curing steps applied as necessary. This would not be possible using the methods of the prior art in which a fully cured composite structure would be supplied already hardened into the second configuration. Such a structure is more difficult and inefficient to store and transport in comparison to the intermediate preform 204 of the present invention.

The present invention may also provide a device for the manufacture of a fibre-reinforced composite structure. The device may comprise a selective curing means arranged to selectively apply heat and/or pressure to at least part of a preform to produce an intermediate preform. The resulting intermediate preform may comprise a plurality of selectively cured portions interconnected by at least one non-selectively cured portion as described above. In some embodiments, the selective curing means may comprise a press mechanism comprising a pair of movable opposing surfaces. The opposable surfaces may be forced together in the manner of a press in order to apply pressure to the preform.

The opposing surfaces of the press mechanism may be arranged to engage the preform to selectively apply heat and/or pressure to at least part of the preform. This may be achieved by heating only parts of the opposing surfaces such that heat applied to the preform is localised at the selectively cured portions. In other embodiments, the opposing surfaces may comprise raised portions arranged to engage with the selectively cured portions to localise the application of pressure to only those parts of the preform. Corresponding recessed portions may be provided such that the opposing surfaces do not contact the preform at the non-selectively cured portions.

In some embodiments, one or both of the opposing surfaces may form a mould arranged to shape the preform. In such an embodiment, the opposing surfaces may form two halves of a mould adapted to shape the intermediate preform to the desired shape. For example, the opposing surfaces may shape the intermediate preform to create the side panels, bulkheads and floor panel of a vehicle body of a chassis.

In other embodiments, the selective curing means may take a different form and may, for example comprise discretely applied heated platens which are arranged to contact areas of the preform that are to be selectively cured. In other embodiments, the selective curing means may comprise a selective energy delivery means arranged to selectively direct energy in the form of radiation (e.g. thermal, ultraviolet, or microwave radiation), convection, induction or conduction to certain parts of the preform. A masking means may also be provided to mask areas of the preform which are to form the non-selectively cured portions. In such embodiments, a separate pressure application means may be provided to apply pressure to all or parts of the preform. The pressure application means may take the form of a vacuum or inflatable bladder.

Figure 6:
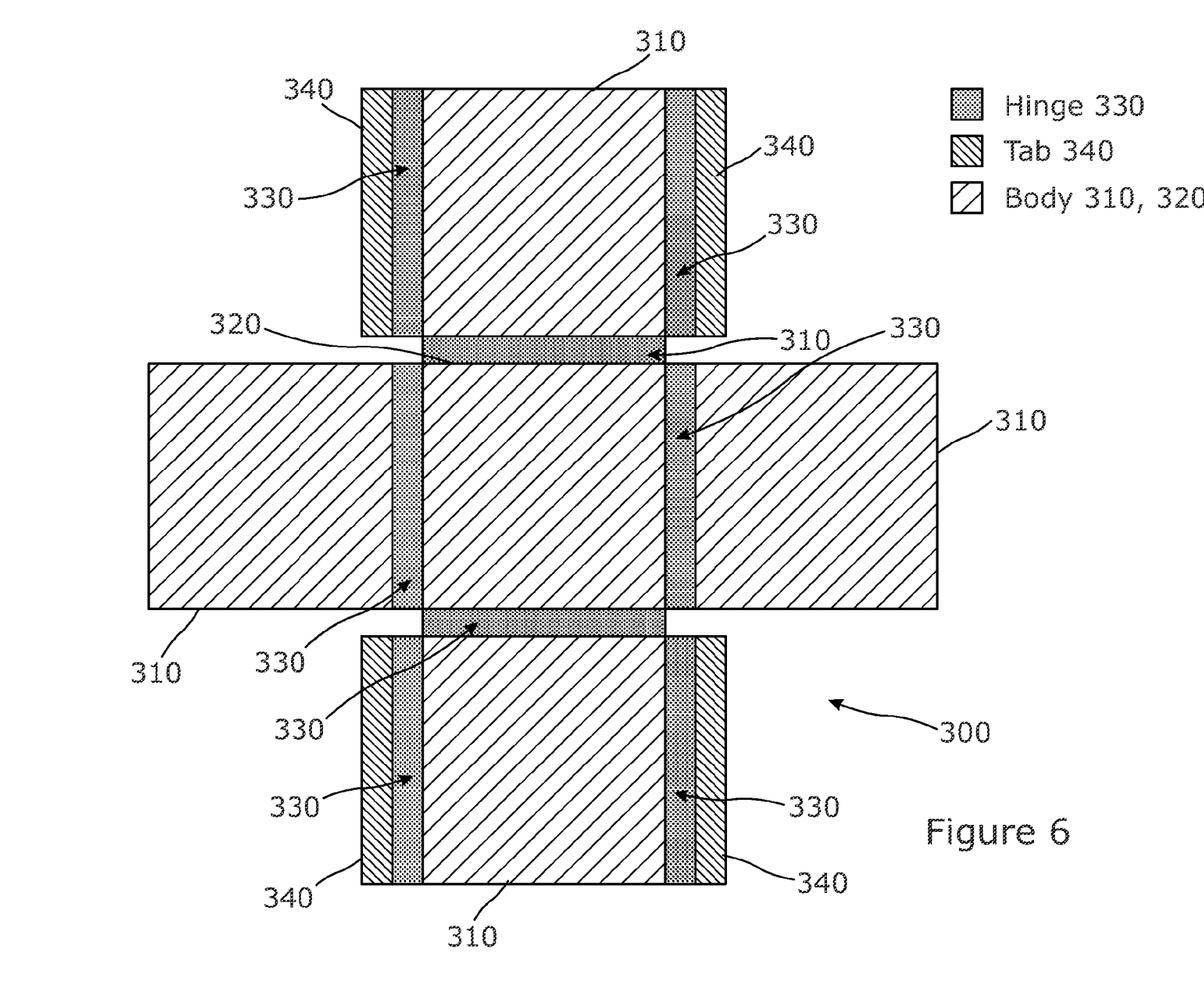
FIG. 6 shows an embodiment of a preform in accordance with an aspect of the invention prior to curing, which may form an open topped box structure.

FIG. 6 shows an example of a preform 300 according to one aspect of the invention which may be used to form a three dimensional structure. As shown this preform comprises a net defining a base 330 and four sides 310 of a box structure. The base is connected to each side by a hinge portion 320. In the context of this application the sides may be considered to be first portions of the preform, the base a second portion of the preform and the hinges third portions of the preform. Also shown are tabs 340 on the edges of two opposed sides which enable the sides to be joined together where they meet vertically in the finished box structure.

Figure 7:
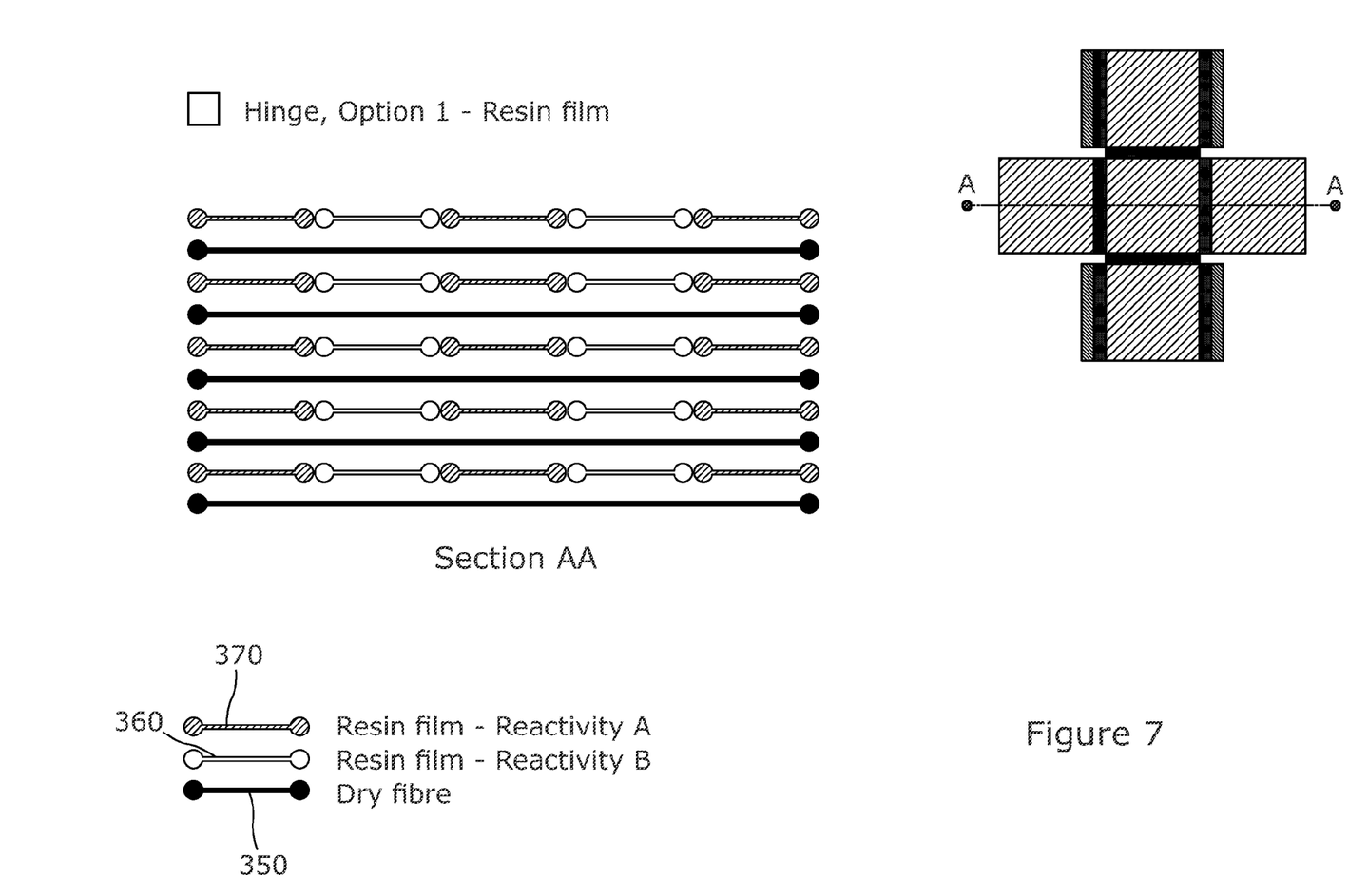
FIG. 7 shows an arrangements of alternate layers of dry sheets of fibre material and resin film that form the preform.

FIG. 7 shows in detail one arrangement of the layers of material that form the preform. As shown, each portion comprises a stack of five layers of dry fibre sheet material. Each sheet extends continouolsy across the sides, the hinges and the base along the section AA. Each sheet is overlaid with two different types of uncured resin film. In the first and second regions a resin film is used which has a lower cure temperature and/or faster cure time than the resin film used in the third portions. This allows a uniform heat to be applied to the whole preform in a first stage of forming an intermediate preform where the base and sides are cured and the hinge portions are not fully cured. The heated resin matrix material of the films will flow into the dry material where it subsequently hardens with the fibres embedded in the resin.

Figure 8:
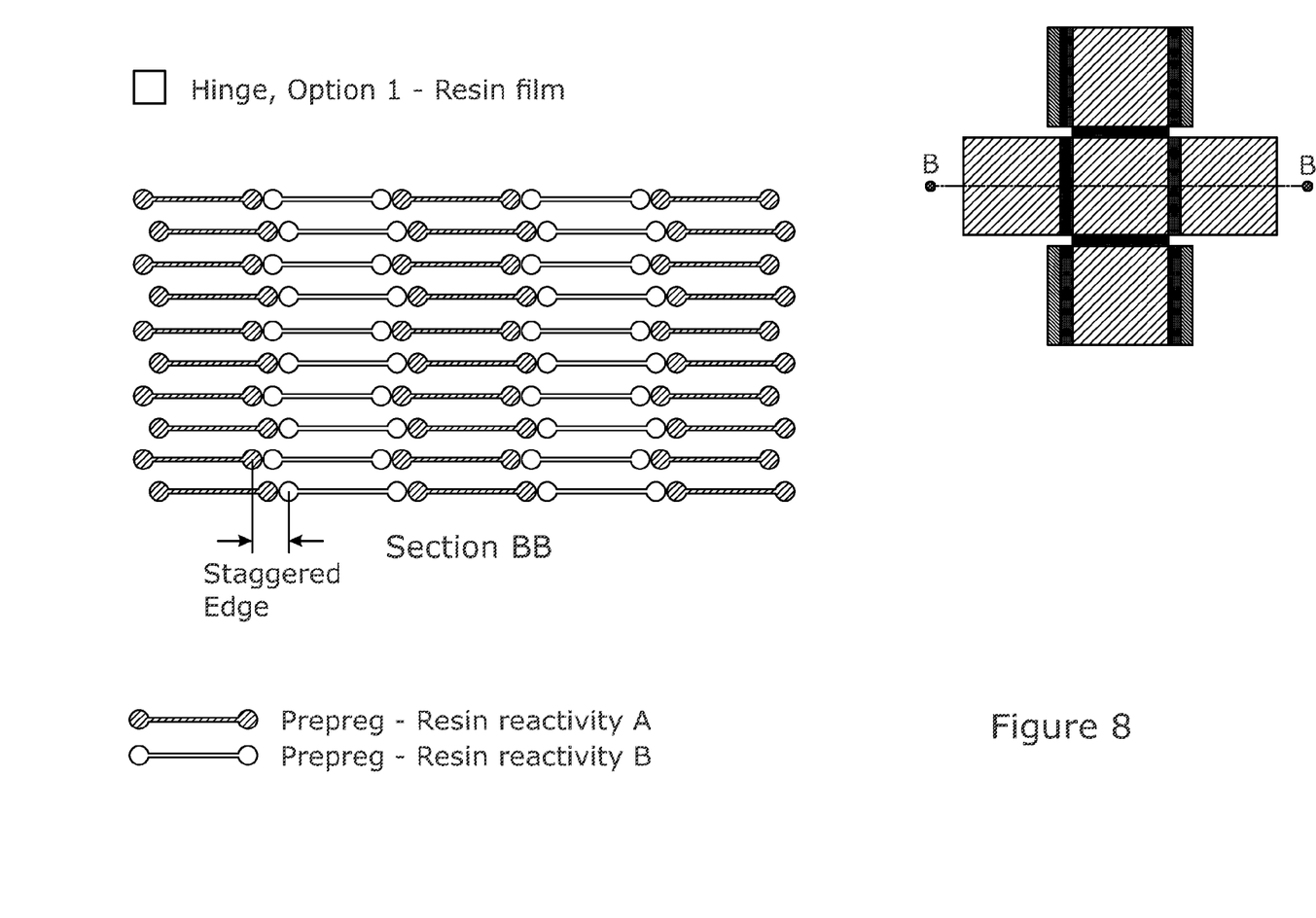
FIG. 8 shows an alternative arrangement which uses pre-impregnated sheets of fibre and resin matrix material.

FIG. 8 shows in detail a second arrangement of the preform along the same section line AA, In this example, rather than dry sheets of fibre laid up alternately with resin film, pre-impregnated sheets are used. In order to have different resin in the hinge portions, the sheets do not extend continuously across from the sides to the base along the line AA. Instead, different sheets are used for the third (hinge) portion compared with the base and sides. To give strength to the intermediate preform it is notable that the edges of the sheets in adjacent layers are offset, or staggered. In this way, the cured sheets of the sides and base will firmly grip the uncured, or partially cured, sheets of the hinge portion, as an intermediate preform is formed.

The method of the invention may be used to produce a wide variety of different shaped articles. It may be used to produce a part of an automobile, such as a body in white or a battery casing or body panel. It may also be used in other sectors, such as the aerospace or rail sector where the characteristic light weight and high strength of composite structures are advantageous.

The invention claimed is:

1. A method of manufacturing a three dimensional composite structure having an internal space, the method comprising steps:
    (a) arranging a preform of fiber reinforced material in a first generally flat configuration in which the preform is supported by a support structure;
    (b) selectively curing the preform when laid out on the support structure to produce an intermediate preform, the intermediate preform comprising at least two selectively cured portions interconnected by at least one non-selectively cured portion;
    (c) adding at least one component onto a selectively cured portion of the preform when it is in the first generally flat configuration; and
    (d) moving the two selectively cured portions with respect to one another to form the three dimensional composite structure in which the two portions at least partially surround the internal space of the structure and the at least one component is located within the internal space of the structure.

2. The method as claimed in claim 1 wherein there are more than two selectively cured portions, each one joined to at least one adjacent selectively cured portion by a non-selectively cured portion.

3. The method as claimed in claim 1, wherein the at least one component is added that will be located inside the three dimensional composite structure once complete.

4. The method as claimed in claim 1, wherein the preform is laid out flat with an upper surface being the surface that will face toward the internal space, and an underside being an outer face of the three dimensional structure once finished.

5. The method as claimed in claim 1, further comprising a further curing step performed once the intermediate preform has been moved to at least partially surround the internal space of the structure.

6. The method as claimed in claim 1, wherein the preform comprises portions of material with different properties arranged at spaced locations.

7. The method as claimed in claim 1, further comprising fitting or installing a reinforcement member to the selectively cured portions of the intermediate preform before it is moved to at least partially surround the internal space of the structure.

8. A method of manufacturing a vehicle, the vehicle comprising a body having a floor, one or more side panels and a roof panel, the method comprising
    forming the body by applying the steps of claim 1, in which the selectively cured portions in step (b) comprise the floor, the one or more side panels, and the roof panel,
    the at least one component comprises at least one vehicle component, and
    adding the at least one component onto the preform comprises installing the at least one vehicle component onto at least one of the selectively cured portions before the body is moved to at least partially surround the internal space of the structure.

\* \* \* \* \*